United States Patent
Rodgers et al.

(10) Patent No.: US 8,264,960 B2
(45) Date of Patent: *Sep. 11, 2012

(54) METHOD AND SYSTEM FOR SHARING AV/RECORD RESOURCES IN A PROGRAMMABLE TRANSPORT DEMULTIPLEXER AND PVR ENGINE

(75) Inventors: Stephane W. Rodgers, San Diego, CA (US); Daniel Z. Simon, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1316 days.

This patent is subject to a terminal disclaimer.

(21) Appl. No.: 11/385,468

(22) Filed: Mar. 21, 2006

(65) Prior Publication Data

US 2006/0268354 A1 Nov. 30, 2006

Related U.S. Application Data

(60) Provisional application No. 60/685,986, filed on May 31, 2005.

(51) Int. Cl.
*G01R 31/08* (2006.01)
*G06F 11/00* (2006.01)
(52) U.S. Cl. ...................................................... 370/231
(58) Field of Classification Search .................. 370/394; 725/18

See application file for complete search history.

(56) References Cited

U.S. PATENT DOCUMENTS

| | | | |
|---|---|---|---|
| 4,473,904 A | 9/1984 | Suehiro et al. | |
| 5,559,999 A * | 9/1996 | Maturi et al. | 713/400 |
| 5,638,370 A | 6/1997 | Seconi et al. | |
| 5,828,416 A * | 10/1998 | Ryan | 348/512 |
| 5,898,695 A * | 4/1999 | Fujii et al. | 370/464 |
| 6,124,866 A * | 9/2000 | Asano et al. | 345/505 |
| 6,320,600 B1 * | 11/2001 | Smith et al. | 715/723 |
| 6,717,952 B2 | 4/2004 | Jones et al. | |
| 6,738,846 B1 | 5/2004 | Slaughter et al. | |
| 6,925,052 B1 | 8/2005 | Reynolds et al. | |
| 7,039,048 B1 | 5/2006 | Monta et al. | |
| 7,526,182 B2 * | 4/2009 | Shibutani | 386/52 |
| 2003/0072555 A1 * | 4/2003 | Yap et al. | 386/40 |
| 2004/0056884 A1 * | 3/2004 | Eifrig et al. | 345/720 |
| 2005/0015794 A1 * | 1/2005 | Roelens | 725/18 |
| 2005/0091057 A1 | 4/2005 | Phillips et al. | |
| 2005/0132264 A1 | 6/2005 | Joshi et al. | |
| 2006/0104305 A1 * | 5/2006 | Yoshida et al. | 370/466 |

\* cited by examiner

*Primary Examiner* — Anh-Vu Ly
*Assistant Examiner* — Maharishi Khirodhar
(74) *Attorney, Agent, or Firm* — Thomas, Kayden, Horstemeyer & Risley LLP

(57) ABSTRACT

A method and system are provided for sharing AV/record resources in a programmable transport/demultiplexer and personal video recorder (PVR) engine. The method may involve utilizing hardware assist architecture to partially process incoming packets, retrieve information about the packets, and write the retrieved information to a memory. A processor programmed with firmware may then utilize the information in memory to perform further processing on the packet data. The processor programmed with firmware may then set up configuration parameters that may be used by the hardware assist architecture to further process the packet. The parameters may be configured such that they may be independent of the format of the packet, where the hardware assist architecture functions may be utilized for processing packets regardless of their format. The system may comprise the hardware assist architecture, the processor programmed with firmware, and a memory.

27 Claims, 5 Drawing Sheets

METHOD AND SYSTEM FOR SHARING AV/RECORD RESOURCES IN A PROGRAMMABLE TRANSPORT DEMULTIPLEXER AND PVR ENGINE

RELATED APPLICATIONS

The application makes reference to, claims priority to, and claims the benefit of U.S. Provisional Application Ser. No. 60/685,986 filed on May 31, 2005.

This application is related to the following applications, each of which is incorporated herein by reference in its entirety:

U.S. patent application Ser. No. 11/348,563 filed Feb. 7, 2006; and

U.S. patent application Ser. No. 11/328,877 filed Jan. 10, 2006.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the present invention relate to processing video and audio signals. More specifically, certain embodiments of the invention relate to a method and system for sharing AV/record resources in a programmable transport demultiplexer and personal video recorder (PVR) engine.

BACKGROUND OF THE INVENTION

Audio and video recording engines and transport demultiplexers may be implemented utilizing separate hardware devices. This approach may result in costly implementations. In this regard, more efficient devices may be necessary that allow multimedia systems to meet the increasing requirements for advanced applications and functionalities with cost effective and/or simplified implementations.

When using all-hardware designs for transport demultiplexers and record engines, at least two issues may arise. First, the use of all-hardware designs makes flexibility of the system in supporting the numerous audio and video formats difficult. An all-hardware design may support a small number of fixed formats, and can fail in providing adequate support to other formats that can be introduced to the system. Additionally, the use of separate, all-hardware designs can be inefficient, especially in terms of chip area, where the use of two completely separate all-hardware designs occupy a large chip-area.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for sharing AV/record resources in a programmable transport/demultiplexer and personal video recorder (PVR) engine, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the present invention relate to processing video and audio signals. More specifically, certain embodiments of the invention relate to a method and system for sharing AV/record resources in a programmable transport/demultiplexer and personal video recorder (PVR) engine.

Modern transport demultiplexers may be required to perform a wide variety of tasks to be able to deal with the different input formats. Modern transport demultiplexers may, therefore, handle a large number of parsing formats, demultiplex several sub-streams from within a large number of multiplexed streams, and provide a host of other functions.

In video systems it may be desirable to support certain functions that may be handled by modern transport demultiplexers. Such functions may include, for example, receiving several streams which have been multiplexed together, separating out whole streams or sub-streams at user discretion; parsing input formats such as, for example, MPEG Transport, Directv Transport, raw PES, DVD, raw ES, and a variety of other formats; recognizing start code or frame synchronization patterns from several different ES layers; assisting in the frame synchronization for video and audio; providing ancillary information about the incoming data to assist the downstream audio or video decoders; providing timestamp management support; providing methods for synchronizing commands from software with the data stream; providing flexibility to support new, as-yet unanticipated formats, and being able to do all of the aforementioned functions at high speeds such as, for example, 200+ Mbits/sec. In this regard, a fast yet programmable solution may be desirable. Such a solution may utilize a double buffer and/or a hardware assist and may be implemented in a record audio video engine (RAVE).

In an embodiment of the present invention, a RAVE may support multiple decoders that support audio and/or video decoding. The RAVE may also provide PVR functions such as, for example, data record, while simultaneously supplying ancillary information to the host software, which may enable it to manage PVR playback and storage to disk. Therefore, the RAVE may combine record functionalities and the audio/video decoding functions. The RAVE may be capable of processing the transport header associated with each of the video decoding, audio decoding, and the record functions. The RAVE may be designed such that it may provide flexibility to allow for subsequent algorithmic changes as may be needed by data format changes, for example. Additionally, the RAVE may maintain a high throughput.

Figure 1:
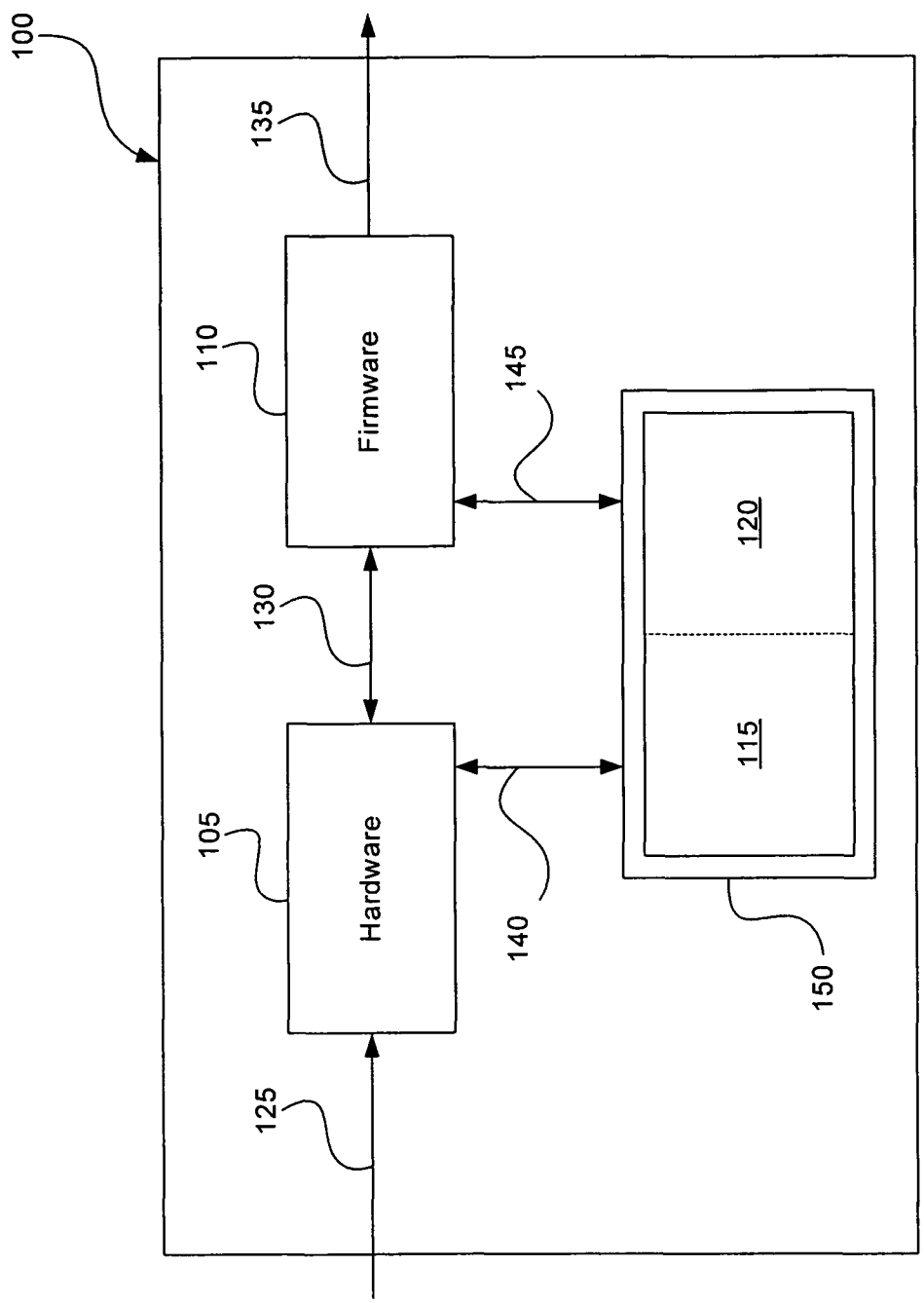
FIG. 1 illustrates a block diagram of an exemplary architecture of a RAVE, in accordance with an embodiment of the present invention.

FIG. 1 illustrates a block diagram of an exemplary architecture of a RAVE 100, in accordance with an embodiment of the present invention. The RAVE 100 may comprise hardware assist architecture 105, a processor programmed with firmware 110, and a memory 150. The input 125 may comprise transport data, where the transport data may comprise packets of video, audio, and record data in any number of formats. The input 125 may also comprise fixed-length sections of non-transport data for non-Record applications. The hardware assist architecture 105 may then perform some processes and pass processed data to the processor programmed with firmware 110, either directly via data path 130 or indirectly via the buffer block 150. A portion of the processed data may be passed from the hardware assist architecture 105 via data path 140 to the memory 150, which may then be accessed by the processor programmed with firmware 110 via data path 145.

Several schemes may be utilized for interfacing the hardware assist architecture 105 with the processor programmed with firmware 110. To increase flexibility and allow for subsequent algorithmic changes, and to maintain high throughput, one or more schemes may be utilized within a RAVE. Using the combination of hardware assist architecture and firmware, the RAVE may provide the flexibility associated with programmability of firmware, and the speed associated with hardware. The hardware assist architecture 105 and the processor programmed with firmware 110 may be interfaced such that speed and programmability may be maintained simultaneously. U.S. patent application Ser. No. 11/348,563 filed Feb. 7, 2006 discusses several approaches of interfacing the hardware assist architecture 105 and the processor programmed with firmware 110 to process the data associated with the received packets. Accordingly, U.S. patent application Ser. No. 11/348,563 filed Feb. 7, 2006 is incorporated herein by reference in its entirety.

In a preferred embodiment of the present invention, the hardware assist architecture 105 may process functions that may be less likely to change such as, for example, MPEG parsing, and the processor programmed with firmware 110 may make most or all of the final decisions of the RAVE 100. Functions that may change as a result of, for example, a new data format may be processed mainly by the processor programmed with firmware 110 with some processing that may be done by the hardware assist architecture 105.

A current packet, packet A, may come into the RAVE 100 via input 125. The hardware assist architecture 105 may then process the packet A. The hardware assist architecture 105 may perform a portion of the functions associated with the processing of the packet A, and may retrieve information associated with the packet A as well. The hardware assist architecture 105 may then set up the hardware assist fields and may write retrieved information to a location in the memory 150 such as, for example, a buffer 115. The hardware assist fields may comprise, for example, address of compare pattern, compare patterns, start/end of PES headers, number of ES bytes in the packet, number of payload bytes in the packet, start of payload, presence of packet errors, type of packet (record or audio/video), etc. These fields and their uses are explored further in U.S. patent application Ser. No. 11/328,877 filed Jan. 10, 2006. Accordingly, U.S. patent application Ser. No. 11/328,877 filed Jan. 10, 2006 is incorporated herein by reference in its entirety.

The processor programmed with firmware 110 may then access and begin processing the data associated with the packet A from the buffer 115, and output the processed data A. Meanwhile, during the time that the processor programmed with firmware 110 is processing the previously received packet A, the hardware assist architecture 105 may process the next packet B, and write the associated retrieved data in another location in the memory 150 such as, for example, a buffer 120. The processor programmed with firmware 110 may then begin processing the most recent packet B from the buffer 120, and the hardware assist architecture 105 may process the next packet C and write the associated information in the buffer 115, effectively replacing the data associated with the packet A previously processed by the processor programmed with firmware 110, since it had already been processed and output.

Figure 2:
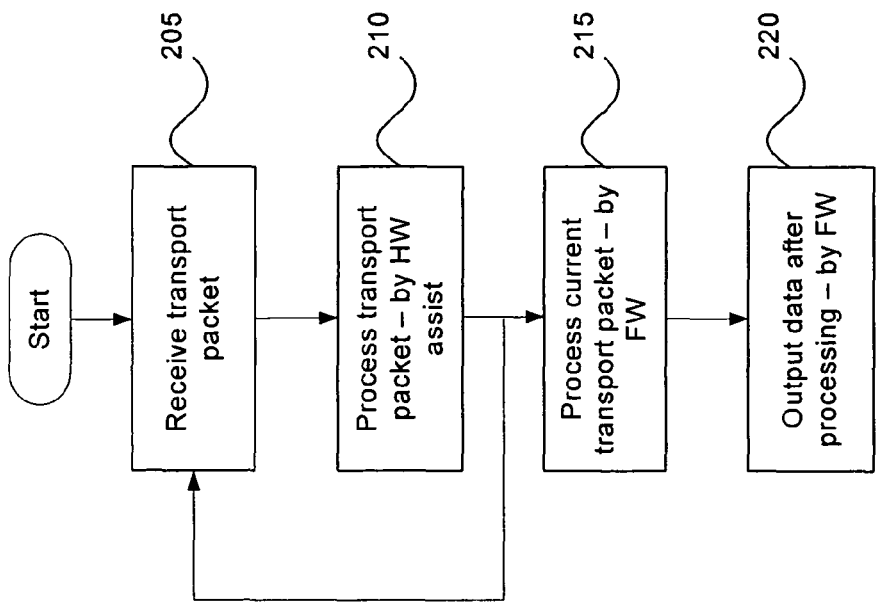
FIG. 2 illustrates a flow diagram of an exemplary method of a programmable transport demultiplexer using a double-buffered approach, in accordance with an embodiment of the present invention.

FIG. 2 illustrates a flow diagram of an exemplary method of a programmable transport demultiplexer using a double-buffered approach, in accordance with an embodiment of the present invention. The programmable transport demultiplexer may be utilized in the RAVE 100 of FIG. 1, which may process packets. The RAVE may comprise hardware architecture for at least partially processing the packets and a processor programmed with firmware for executing instructions that may cause the processor to determine whether the packets are associated with an audio/video function or a record function.

At an initial block 205 a packet may be received by the RAVE where initially a program may be executed to determine whether the packet is associated with an audio/video function or a record function. The packet may then be at least partially processed by the hardware assist architecture at a next block 210. The hardware assist architecture may retrieve from the packet information to set up hardware assist fields, where setting up the hardware assist fields may vary based on the function associated with the received packet, i.e., audio/video or record. The hardware assist architecture may also retrieve from the packet information that may be utilized by the processor programmed with firmware and write such information to a first buffer. At a next block 215, the processor programmed with firmware may access the information from the first buffer and process the data from the packet. Meanwhile, at the same time the processor programmed with firmware is processing the data from the packet, the next packet may be received at block 205, and the hardware assist architecture may retrieve from the next packet information to set up hardware assist fields at block 210 and may also retrieve from the packet information that may be utilized by the processor programmed with firmware and will write such information to a second buffer.

The result of the firmware processing may then be output at a block 220. The processor programmed with firmware, at the next block 215, may access the data from the second buffer to further process the packet, while the hardware assist architecture retrieves information from the next packet and writes to the first buffer, which may contain the data associated with the first packet, effectively overwriting the data from the processor programmed with firmware processing of the packet two packets earlier, which had already been output. The method may continue where the hardware may process received packets while the processor programmed with firmware may be processing the previous packet.

Figure 3:
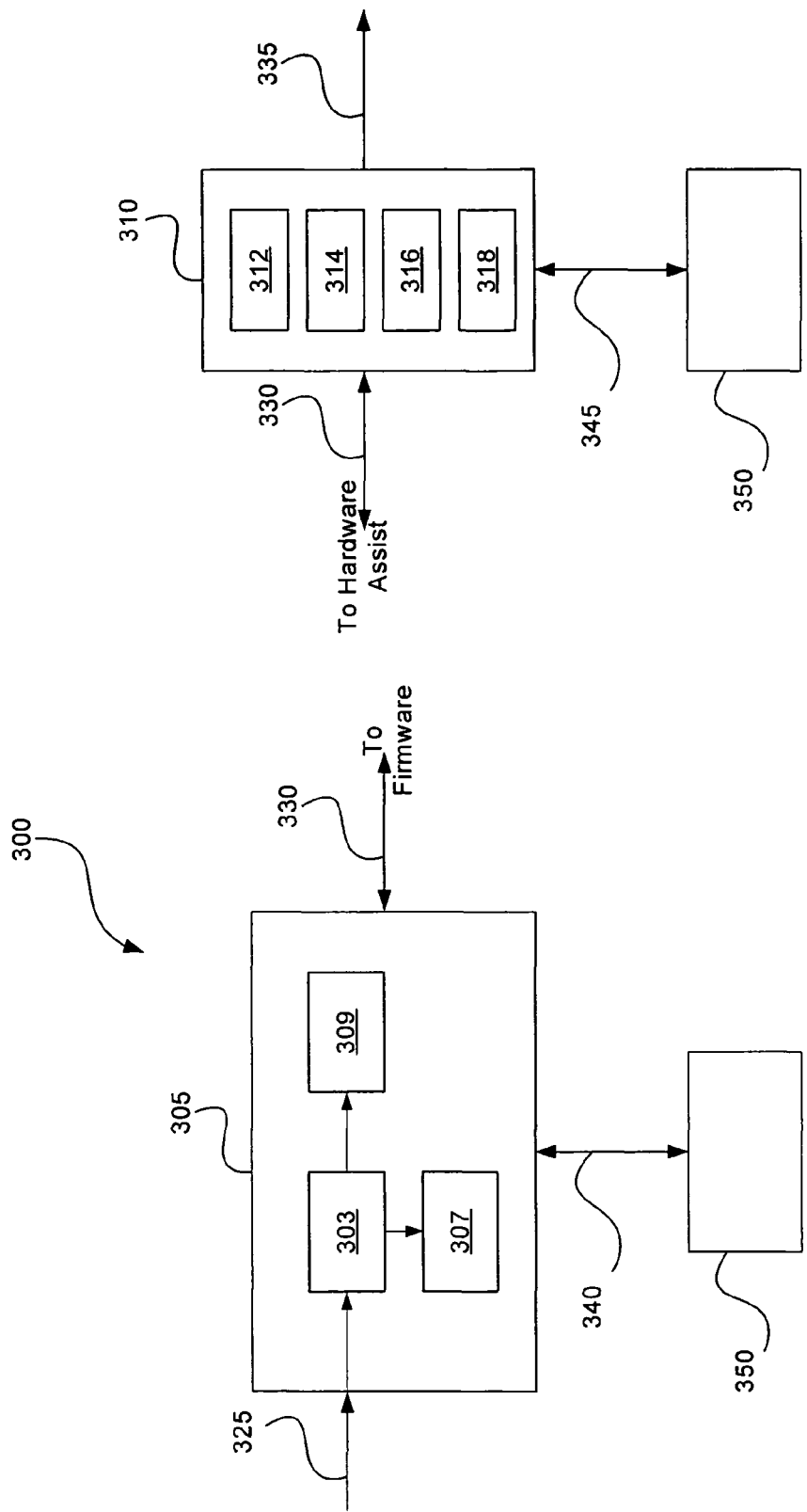
FIG. 3A illustrates a block diagram of an exemplary hardware architecture of a RAVE, in accordance with an embodiment of the present invention.
FIG. 3B illustrates a flow diagram of exemplary processes of firmware in a RAVE, in accordance with an embodiment of the present invention.

FIG. 3A illustrates a block diagram of exemplary hardware assist architecture 300 of a RAVE, in accordance with an embodiment of the present invention. The hardware assist architecture 305 may be, for example, the hardware assist architecture 105 as described with reference to FIG. 1. The hardware assist architecture 305 may receive a current packet, via input 325. The hardware assist architecture 305 may comprise, for example, logic units 303, 307, and 309. The logic unit 303 may receive the received packet and may detect the type of the packet. The type of packet may be detected on a higher level such as, for example, whether the data is record data or audio/video data, or on a lower level such as, for example, in the case of video, what the video encoding format is, i.e. MPEG-1, MPEG-2, MPEG-4, etc.

The hardware assist architecture 305 may then process the packet. Based on the determined format, logic units 307 and 309 of the hardware assist architecture 305 may set up the hardware assist fields in a memory 350. The fields may be set up such that they may be generic and independent of the type of data in the packet. The logic units 307 and 309 may also retrieve information associated with the packet. The retrieved information may then be written to the memory 350. The retrieved information may be written in a generic way that may be independent of the format or type of data of the packet. As a result, the RAVE may be capable of processing different types of record and audio/video data and the processing by the processor programmed with firmware may not be influenced by the format of the data of the packet.

The hardware assist fields may comprise, for example, address of compare pattern, compare patterns, start/end of PES headers, number of ES bytes in the packet, number of payload bytes in the packet, start of payload, presence of packet errors, type of packet (record or audio/video), etc. These fields and their uses are explored further in U.S. patent application Ser. No. 11/328,877 filed Jan. 10, 2006. Accordingly, U.S. patent application Ser. No. 11/328,877 filed Jan. 10, 2006 is incorporated herein by reference in its entirety.

FIG. 3B illustrates a flow diagram of exemplary processes of firmware in a RAVE, in accordance with an embodiment of the present invention. The processor programmed with firmware 310 may be, for example, the processor programmed with firmware 110 as described with reference to FIG. 1. The hardware assist architecture 305 may complete processing of a packet, by setting up the hardware assist fields and other information relevant to the processor programmed with firmware processing of the packet. The hardware assist architecture 305 may write the hardware assist fields and other information to the memory 350. The processor programmed with firmware 310 may then access and begin processing the data associated with the packet from the memory 350. The processor programmed with firmware 310 may not distinguish the format or data type associated with the packet, since the hardware assist fields may be generic and set up by the hardware assist architecture 305 as to be independent of the format of the input packet. The processor programmed with firmware 310 may perform functions associated with processing the packets such as, for example, record processes, audio decoding, video decoding, etc. While the processor programmed with firmware 310 may be processing data associated with a first packet, the hardware 305 may process the next incoming packet and write the associated retrieved data in another location in the memory 350.

The processor programmed with firmware 310 may comprise functions 312 for processing record data, functions 314 for processing audio data, functions 316 for processing video data, and other functions 318 that may be processed in association with any packet. The processor programmed with firmware 310 may output the processed data 335, which may be retrieved by the appropriate circuitry for further processing or display.

Referring to FIG. 1, the RAVE 100 merges record functions and audio/video functions using the hardware assist architecture 105 and processor programmed with firmware 110. Therefore the RAVE 100 may provide a cost-effective, fast, and programmable solution. To provide a more efficient and cost-effective solution, the processing done by the hardware assist architecture 105 and the processor programmed with firmware 110 may be shared between the record functions and audio/video functions. The hardware assist architecture 105 may be used to provide information to the processor programmed with firmware 110, which may provide most of the final processing and decision-making. The hardware assist architecture 105 may be designed such that a maximum amount of functionality common to both record functions and audio/video functions may be identified and processed by a common set of hardware assist architecture 105, while minimizing the amount of function-specific portion of hardware assist architecture 105.

Some differences between record functions and audio/video functions may be the following:

1) Input format: the record functions and audio/video functions may accept different types of inputs. For example, the audio/video functions may accept transport, PES, ES, or program stream formatted data, whereas the record functions may accept only transport data as input.
2) Output format: generally audio/video functions output ES data, while record functions output transport data
3) Output stream: generally when audio/video data is sent to a decoder (audio or video), one stream may be sent at a time, whereas for record, multiple PIDs may be put in the same buffer
4) Channels: states may be stored independently for each audio/video channel, while for record channels, states may be stored for multiple PID channels within the output buffer
5) Output data encryption: audio/video data outputs generally may not be encrypted, while for record channels the output data may be encrypted
6) The audio/video transport demultiplexer may assist downstream decoders in acquiring frame sync
7) In the system as a whole, the same data may need to go to an audio/video channel and a record channel simultaneously In the hardware assist architecture 105, the hardware assist fields may be set up for the data in the received packets, such that the same portion of the hardware assist architecture 105 may be used for common fields. Some of the hardware assist fields may be configurable by the RAVE such that despite possible differences between the fields for the audio/video functions and the fields for the record functions, the fields may be configured to "look" the same. This is possible because most of these fields are common for both the audio/video functions and record functions. For example, the output format for audio/video channels is usually ES, while for record it is usually transport. However in the RAVE 100, a common set of configurable fields may be used to indicate output format, regardless of whether the context is audio/video or record. As a result, if it is ever desired to record in ES or send data to decoders in transport format, the function is available.

As a result, for the example above, the hardware assist architecture 105 may eliminate functionality that would otherwise have to check the type of input (audio/video or record) then decide the output format (ES or transport). Instead, whatever format the input is, the output may be configured as "output" without having to use specific configuration and thus eliminating the need for hardware for making a decision. Hence, output format may be decided purely on the basis of the context. The hardware that outputs the final processed data after being processed by the processor programmed with firmware 110 may be selected to output ES or transport based on the configuration, therefore, one hardware engine may be used instead of two.

The same methodology may be utilized in configuring other functions in the hardware assist architecture 105. Most functions may be implemented as to depend as little as possible on whether the input is audio/video or record data; as a result there may be minimal checking to see whether a context is audio/video or record before allowing a certain function. Instead, the hardware may be designed to allow all possible modes, and the selection of functionality may be performed purely by context, and most hardware assist architecture 105 blocks and logic may be useable by both audio/video functions and record functions. As a result, the hardware may be slightly bigger than would be required for only one of the functions, but much smaller than would be required if both functions were implemented separately. Therefore, the RAVE 100 provides a cost-effective combination of audio/video and record functions, while providing programmability for both functions as well.

The processor programmed with firmware 110 may be utilized to set up the hardware assist architecture 105. Since the hardware assist architecture 105 functionalities are shared for the audio/video functions and the record functions, the processor programmed with firmware 110 may set up the hardware logic differently based on the functions associated with a receive packet.

For example, one such shared function in hardware may be stream parsing. In a system with separate hardware for each of the audio/video functions and the record functions, the stream parsing function for audio/video provides a different output from the stream parsing function for a record. For audio/video streams, the stream parsing function outputs ES data, whereas for record streams, the stream parsing output transport data. In the RAVE 100 of the present invention, the processor programmed with firmware 110 may set up certain signals and configure certain parameters of the stream parsing function in the hardware assist architecture 105 depending on the format of the stream such that the stream may be parsed correctly, yielding the appropriate output data format.

Another example may be a function that examines data to look for the occurrence of a particular pattern. A pattern in the audio/video stream may be used to assist the downstream decoders with frame synchronization. On the other hand, a pattern in the record stream may be used by software to determine where a frame starts. The two patterns may be very different, however, the hardware assist function that looks for the patterns may be in essence very similar. The processor programmed with firmware may then set up the parameters of the function that looks for a pattern within a stream depending on the format of the stream, and therefore, the same hardware function may be used with the two streams.

Furthermore, after the stream parsing function in the hardware assist architecture completes parsing the received packet, the hardware assist architecture may send to the processor programmed with firmware, along with the parsed packet, information regarding where the boundaries of the packets are. The processor programmed with firmware then may be able to look through the packet to determine how to configure parameters for other functions to be executed by the hardware assist architecture.

Figure 4:
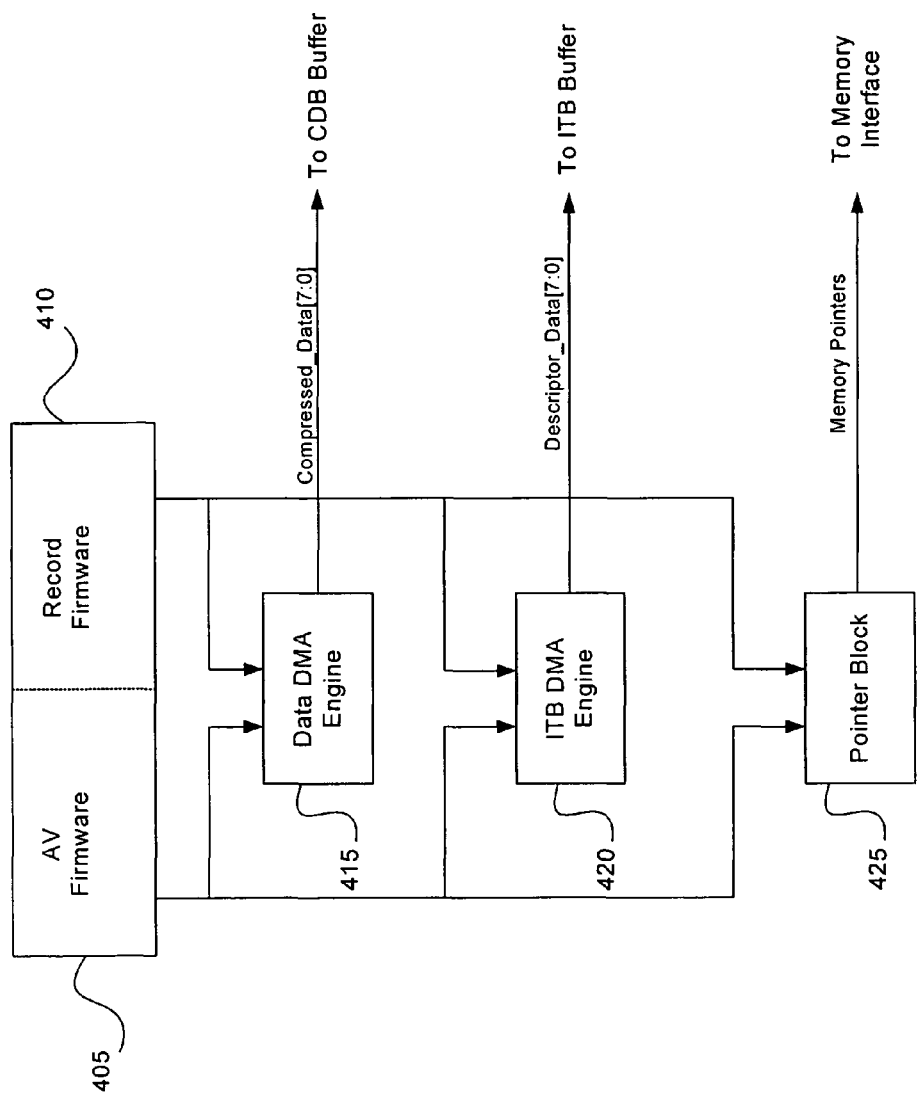
FIG. 4 illustrates a block diagram of an exemplary structure of merged firmware and a portion of hardware assist, in accordance with an embodiment of the present invention.

FIG. 4 illustrates a block diagram of an exemplary structure of merged firmware and a portion of hardware assist, in accordance with an embodiment of the present invention. When the hardware completes parsing a packet, it may send it to the processor programmed with firmware. The parsed packet may then be sent to the audio/video portion of the processor programmed with firmware 405 if the received packet is an audio/video data packet, and to the record portion of the processor programmed with firmware 410 if the received packet is a record data packet. The audio/video portion of the processor programmed with firmware 405 and the record portion of the processor programmed with firmware 410 may then provide different components of the hardware assist architecture with data extracted from the parsed packets for further hardware processing. Some of the hardware assist architecture components may be, for example, a data DMA engine 415, an ITB DMA engine 420, and a pointer block 425.

The data DMA engine 415 may, depending on the format of the packet data, output a whole packet for record or ES data for audio/video. The data DMA engine 415 may send its output to a context data buffer, which may be part of the hardware assist architecture. Since the ES data is a subset of the packet, the hardware assist architecture may indicate where in the packet the DMA engine 415 may locate the needed ES data, based on the desired function. The audio/video portion of the processor programmed with firmware 405 and the record portion of the processor programmed with firmware 410 may provide the data DMA engine 415 with offsets associated with the packets. For example, when doing PVR, the record offsets may relate to the beginning of the record session, and in audio/video, the offsets may indicate the address locations of ES offsets with the audio/video packet.

The index table buffer (ITB) DMA engine 420 may comprise a set of functions. The ITB may be a buffer of descriptors that point to various things such as, for example, patterns found by generic comparators in the hardware assist architecture. Other things the buffer of descriptors may point to may be, for example, audio/video-specific descriptors, or record-specific descriptors. For example, the ITB buffer may hold address fields, which may, for example, point to an ES address for an audio/video packet. Whereas for a record packet the ITB buffer may hold the number of bytes recorded up to the location indicated by the buffer index. These values may be calculated by the hardware with control provided by the processor programmed with firmware. The ITB DMA engine 420 may have a host of HW assist functions, which assist the firmware in producing accurate ITB data for both the audio/video and Record functions. These functions may have different ITB formats, but a common set of HW assist may be used to assist the firmware in generating both types of ITB data.

The pointer block 425 may generate pointers that point to addresses in memory that the downstream client may need to read for later processes such as, for example, decoding for audio/video data or playback software for record data. For each context, whether it is an audio/video context or a record context, a set of buffers may be used based on which the pointer block 425 may generate the appropriate pointers.

In general, when the hardware assist architecture of the RAVE first receives a packet, a determination may be made as to whether the context is audio/video or record. One exemplary way of determining the context of a stream may be by mapping the PID channel number associated with the packet to a context in a PID table. The packet may then go through a parsing block, which may extract information about the packet. The extracted information may comprise the hardware assist fields discussed hereinabove. The extracted information may then be written to memory, which may be accessible by the processor programmed with firmware. The packet data itself may also be written to the memory. The processor programmed with firmware may then begin accessing the packet and the associated information extracted from the packet by the hardware assist architecture. The processor programmed with firmware may also receive an indication of whether the packet is audio/video or record. Depending on the type of the packet, the processing may jump to the appropriate portion of the processor programmed with firmware to begin the processing associated with the packet. Using the hardware assist fields, the processor programmed with firmware may set up the data needed to configure the data DMA engine 415, the ITB to configure the ITB DMA engine 420, and the data needed to configure the pointer block 425. The setup of the different blocks may be similar for audio/video data as for record data, and the difference may be in the location where the processor programmed with firmware may look for the needed data to set up the different blocks.

Figure 5:
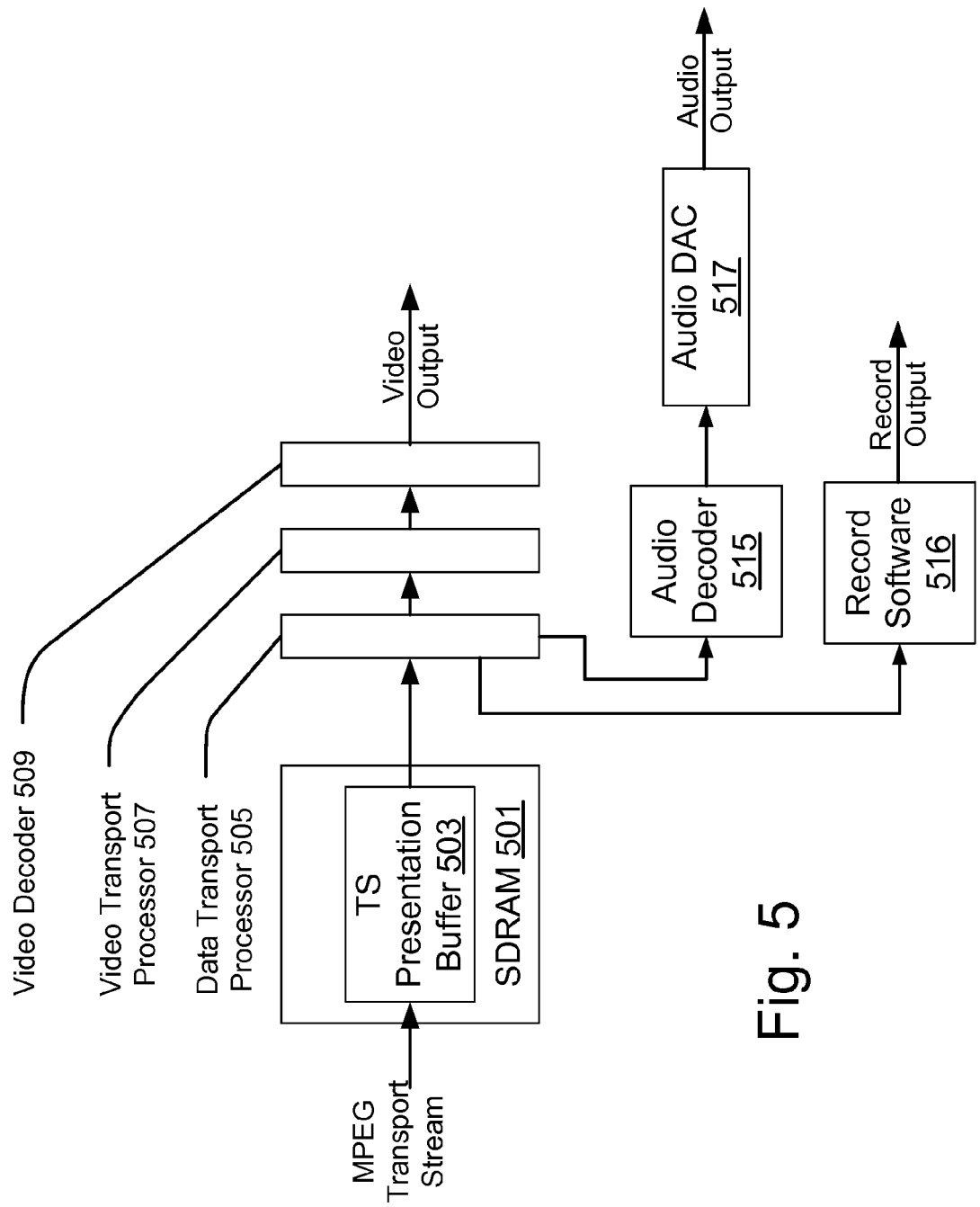
FIG. 5 illustrates a block diagram of an exemplary circuit for decoding compressed video data, in accordance with an embodiment of the present invention.

FIG. 5 illustrates a block diagram of an exemplary circuit for decoding compressed video data, in accordance with an embodiment of the present invention. Data may be received and stored in a presentation buffer 503 within a Synchronous Dynamic Random Access Memory (SDRAM) 501. The data may be received from either a communication channel or from a local memory, such as, for example, a hard disc or a DVD.

The data output from the presentation buffer 503 may then be passed to a data transport processor 505. The data transport processor 505 may demultiplex the transport stream into packetized elementary stream constituents, and pass the audio transport stream to an audio decoder 515 and the video transport stream to a video transport processor 507 and then to a video decoder 509, for example. The audio data may then be sent to the output blocks, and the video may be sent to a display engine. Additionally, Record data may be sent to Record functions such as, for example, the Record software 516. The RAVE may be, for example, a data transport processor such as, the data transport processor 505. In an embodiment of the present invention, the transport stream may comprise record data, and audio/video data.

The hardware assist fields may be set up such that they may be generic and independent of the type of data in the packet. As a result, the RAVE may be capable of processing different types of record and audio/video data and the processing by the processor programmed with firmware may not be influenced by the format of the data of the packet, and as a result the same code in the processor programmed with firmware may be used to process data regardless of the format of the associated packet.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Program in the present context means any expression, in any language, code or notation, of a set of instructions intended to cause a system having an information processing capability to perform particular functions either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
receiving a data packet;
first processing said data packet based on a type of said data packet;
storing information associated with said data packet into a memory; transmitting said data packet to:
a first circuitry when said data packet comprises a video data packet; and a second circuitry when said data packet comprises a record data packet;
second processing said data packet using said information from said memory based on configuration of hardware assisted fields, wherein said second processing is independent of said type of said data packet, and generating a record offset related to the beginning of a record session when said data packet comprises said record data packet.

2. The method of claim 1 wherein said type is based on an encoding format.

3. The method of claim 2 wherein said encoding format comprises MPEG-1.

4. The method of claim 2 wherein said encoding format comprises MPEG-2.

5. The method of claim 2 wherein said encoding format comprises MPEG-4.

6. The method of claim 1 wherein said type is based on whether said data packet comprises record data or audio/video data.

7. The method of claim 1 wherein said information comprises an address of a compare pattern.

8. The method of claim 1 wherein said information comprises compare patterns.

9. The method of claim 1 wherein said information comprises contents of a start header.

10. The method of claim 1 wherein said information comprises contents of an end header.

11. The method of claim 1 wherein said information comprises the number of ES bytes in said data packet.

12. The method of claim 1 wherein said information comprises the number of bytes in the payload of said data packet.

13. The method of claim 1 wherein said information comprises said type of said data packet.

14. A system comprising:
one or more circuits operable for, at least:
receiving a data packet;

first processing said data packet based on a type of said data packet;

storing information associated with said data packet into a memory;

transmitting said data packet to:

a first circuitry when said data packet comprises a video data packet; and a second circuitry when said data packet comprises a record data packet;

second processing said data packet using said information from said memory based on configuration of hardware assisted fields, wherein said second processing is independent of said type of said data packet, and generating a record offset related to the beginning of a record session when said data packet comprises said record data packet.

15. The system of claim 14 wherein said type is based on an encoding format.

16. The system of claim 15 wherein said encoding format comprises MPEG-1.

17. The system of claim 15 wherein said encoding format comprises MPEG-2.

18. The system of claim 15 wherein said encoding format comprises MPEG-4.

19. The system of claim 14 wherein said type is based on whether said data packet comprises record data or audio/video data.

20. The system of claim 14 wherein said information comprises an address of a compare pattern.

21. The system of claim 14 wherein said information comprises compare patterns.

22. The system of claim 14 wherein said information comprises contents of a start header.

23. The system of claim 14 wherein said information comprises contents of an end header.

24. The system of claim 14 wherein said information comprises the number of ES bytes in said data packet.

25. The system of claim 14 wherein said information comprises the number of bytes in the payload of said data packet.

26. The system of claim 14 wherein said information comprises said type of said data packet.

27. A method of processing data packets comprising:

receiving a data packet;

transmitting said data packet to:

a first portion of a processor if said packet comprises a first type of packet, and a second portion of said processor if said data packet comprises a second type of packet;

first determining one or more first offset values related to one or more locations of data associated with said data packet if said packet comprises first type of packet, said first determining performed by said first portion of said processor;

second determining one or more second offset values related to the beginning of one or more record sessions if said data packet comprises a second type of packet, said second determining performed by said second portion of said processor;

demultiplexing said data packet using said one or more first offset values if said data packet comprises said first type of packet, and performing personal video recording functions using said one or more second offset values if said data packet comprises said second type of packet.

* * * * *